(12) United States Patent
Kuo et al.

(10) Patent No.: US 8,269,118 B2
(45) Date of Patent: Sep. 18, 2012

(54) TOUCH PANEL

(75) Inventors: Jing-Tin Kuo, Taipei (TW); Pei-Yu Chen, Miaoli County (TW); Yu-Chuan Lin, Hsinchu County (TW); Wei-Jen Chang, Yilan County (TW); Kuo-Hsing Cheng, Hsinchu County (TW)

(73) Assignee: Au Optronics Corporation, Hsinchu (TW)

( * ) Notice: Subject to any disclaimer, the term of this patent is extended or adjusted under 35 U.S.C. 154(b) by 519 days.

(21) Appl. No.: 12/625,474

(22) Filed: Nov. 24, 2009

(65) Prior Publication Data

US 2010/0320009 A1 Dec. 23, 2010

(30) Foreign Application Priority Data

Jun. 18, 2009 (TW) .............................. 98120484 A (51) Int. Cl.
G06F 3/044 (2006.01)
(52) U.S. Cl. ..................................... 178/18.06; 345/173
(58) Field of Classification Search .................. 345/173, 345/174; 178/18.06, 18.01, 18.03
See application file for complete search history.

(56) References Cited

U.S. PATENT DOCUMENTS

| | | | |
|---|---|---|---|
| 6,104,465 A | 8/2000 | Na et al. | |
| 7,030,860 B1 | 4/2006 | Hsu et al. | |
| 2005/0179668 A1 | 8/2005 | Edwards | |
| 2005/0237812 A1 | 10/2005 | Chang | |
| 2006/0256272 A1 | 11/2006 | Liou et al. | |
| 2007/0268272 A1* | 11/2007 | Perski et al. ................... | 345/173 |
| 2008/0043162 A1 | 2/2008 | Tung et al. | |
| 2008/0129944 A1 | 6/2008 | Park | |
| 2008/0158178 A1* | 7/2008 | Hotelling et al. ............. | 345/173 |
| 2009/0154121 A1 | 6/2009 | Lee | |
| 2010/0182254 A1* | 7/2010 | Lee et al. ....................... | 345/173 |

FOREIGN PATENT DOCUMENTS

| | | |
|---|---|---|
| CN | 1746966 | 3/2006 |
| CN | 101329610 | 12/2008 |
| TW | I277133 | 3/2007 |
| TW | M344544 | 11/2008 |

OTHER PUBLICATIONS

"1st Office Action of China Counterpart Application" issued on Jul. 1, 2010, p. 1-p. 4, in which the listed references were cited.

* cited by examiner

Primary Examiner — Adam R Giesy
(74) Attorney, Agent, or Firm — Jianq Chyun IP Office (57) ABSTRACT

A touch panel includes a substrate, a touch-sensing circuit, a plurality of sensing signal transmission wires, a capacitance compensation conductor, and a sensing signal readout circuit. The touch-sensing circuit is disposed on the substrate. The sensing signal transmission wires are disposed on the substrate and electrically connected to the touch-sensing circuit. The capacitance compensation conductor is disposed over the sensing signal transmission wires. Capacitance of each sensing signal transmission wire is C1, and coupling capacitance between each sensing signal transmission wire and the capacitance compensation conductor is C2. The sensing signal readout circuit is electrically connected to the sensing signal transmission wires. In each sensing signal transmission wire, variation of summation of C1 and C2 is less than a readout resolution of the sensing signal readout circuit. Another touch panel using an electrostatic discharge conductor to adjust varied capacitances of sensing signal transmission wires is also provided.

17 Claims, 9 Drawing Sheets

TOUCH PANEL

CROSS-REFERENCE TO RELATED APPLICATION

This application claims the priority benefit of Taiwan application serial no. 98120484, filed on Jun. 18, 2009. The entirety of the above-mentioned patent application is hereby incorporated by reference herein and made a part of specification.

BACKGROUND OF THE INVENTION

1. Field of the Invention

The present application relates to a touch-sensing apparatus. More particularly, the present application relates to a touch panel.

2. Description of Related Art

In the current information era, people are more dependent on electronic devices. Electronic products including notebook computers, cellular phones, personal digital assistants (PDAs), and digital walkmans become indispensable in our day-to-day lives and work. The above-mentioned electronic products are all configured with input interfaces for users to input commands which are automatically executed by internal systems of the electronic products. At present, the most common input interfaces include keyboards, mice, and touch panels.

In recent years, the touch panels have been extensively applied to various electronic products, such as global positioning systems (GPSs), PDAs, cellular phones, hand-held PCs, and so on. Since the conventional input devices (e.g. the keyboards and the mice) are mostly replaced by the touch panels, human-machine interfaces of the electronic products with the touch panels become more user-friendly. Besides, more space is available for installing a large-sized display panel which facilitates the users to browse information.

Currently, the touch panel can be categorized into a resistive touch panel and a capacitive touch panel based on its driving manner and structural design. The capacitive touch panel has a multiple touch sensing feature and thus has become popularized.

Figure 1A:
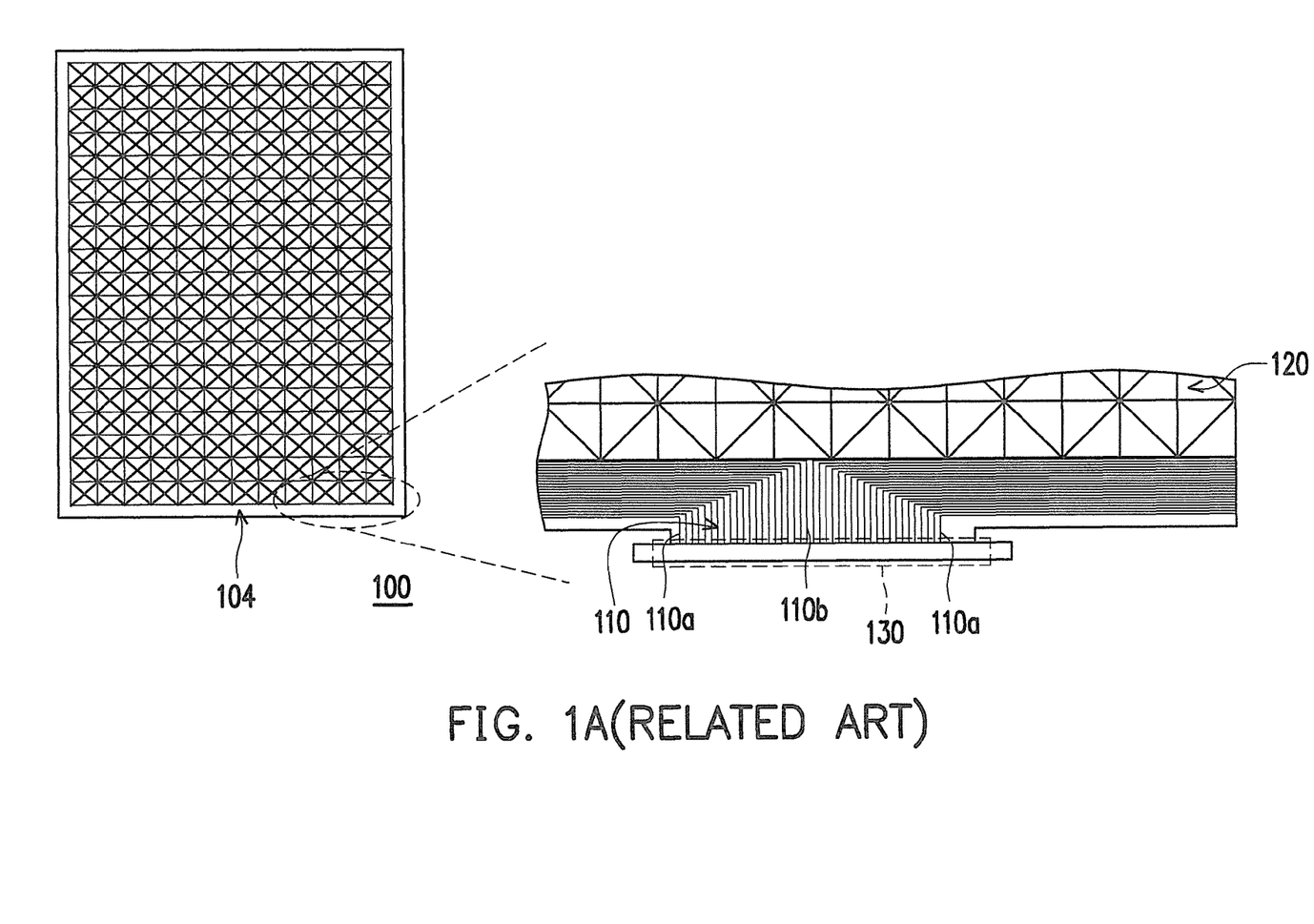
FIG. 1A is a top view of a conventional touch panel.
Figure 1B:
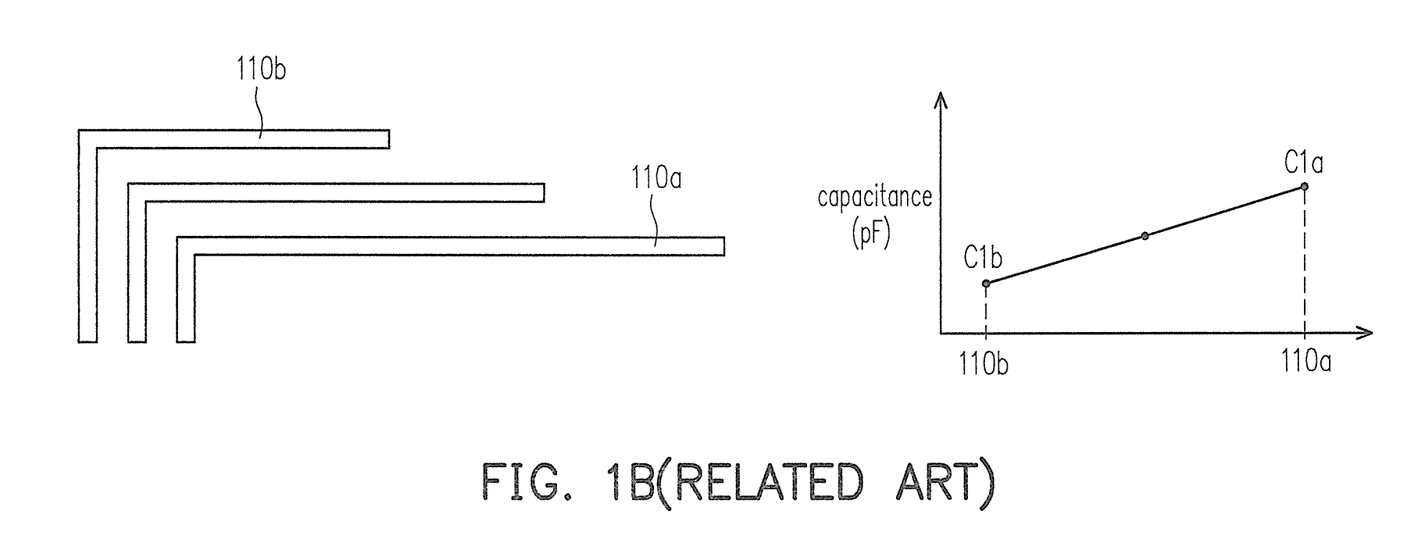
FIG. 1B is a partial enlarged view of sensing signal transmission wires in a conventional touch panel and schematically illustrates capacitance of the sensing signal transmission wires.

FIG. 1A is a top view of a conventional touch panel. In FIG. 1A, a sensing chip 130 located in a peripheral region of the touch panel 100 detects touch-sensing signals of a touch-sensing circuit 120 in a touch-sensing region. As indicated in FIG. 1A, in consideration of utilization of the substrate, sensing signal transmission wires 110 located at the peripheral region have different length, such that capacitance of sensing signal transmission wires 110b located in the center of the substrate is different from capacitance of sensing signal transmission wires 110a located at right and left sides of the substrate. Specifically, FIG. 1B is a partial enlarged view of sensing signal transmission wires in a conventional touch panel and schematically illustrates capacitance of the sensing signal transmission wires. As shown in FIG. 1B, the capacitance of the wires is proportional to the length of the wires. Therefore, in FIG. 1B, capacitance C1a of the longer sensing signal transmission wires 110a is greater than capacitance C1b of the shorter sensing signal transmission wires 110b.

Based on the above, the capacitance of the sensing signal transmission wires in the conventional touch panel is varied. Additionally, the sensing chip is rather sensitive to variations in the capacitance. Therefore, even though a user has not yet touched touch-sensing circuits, the sensing chip in the conventional touch panel is likely to erroneously detect the touch-sensing signals due to different capacitances of the sensing signal transmission wires. Accordingly, improvement in the conventional touch panel is anxiously desired.

SUMMARY OF THE INVENTION

The present application is directed to a touch panel capable of preventing erroneous detection of touch-sensing signals caused by different capacitances of sensing signal transmission wires.

In the present application, a touch panel including a substrate, a touch-sensing circuit, a plurality of sensing signal transmission wires, a capacitance compensation conductor, and a sensing signal readout circuit is provided. The touch-sensing circuit is disposed on the substrate. The sensing signal transmission wires are disposed on the substrate and electrically connected to the touch-sensing circuit. The capacitance compensation conductor is disposed over the sensing signal transmission wires. Capacitance of each of the sensing signal transmission wires is C1, and coupling capacitance between each of the sensing signal transmission wires and the capacitance compensation conductor is C2. The sensing signal readout circuit is electrically connected to the sensing signal transmission wires. In each sensing signal transmission wire, variation of summation of the capacitances C1 and C2 is less than a readout resolution of the sensing signal readout circuit.

According to an exemplary embodiment of the present invention, the capacitance C1 of each of the sensing signal transmission wires is substantially different, for example. Besides, the coupling capacitance C2 between each of the sensing signal transmission wires and the capacitance compensation conductor is substantially different.

According to an exemplary embodiment of the present invention, the touch-sensing circuit includes a plurality of first sensing series and a plurality of second sensing series. The first sensing series are disposed on the substrate. Each of the first sensing series extends along a first direction and is electrically insulated from one another. The second sensing series are disposed on the substrate. Each of the second sensing series extends along a second direction and is electrically insulated from one another. Each of the first sensing series includes a plurality of first sensing pads and a plurality of first bridge portions, and each of the first bridge portions is electrically connected to the adjacent first sensing pads. Each of the second sensing series includes a plurality of second sensing pads and a plurality of second bridge portions, and each of the second bridge portions is electrically connected to the adjacent second sensing pads.

According to an exemplary embodiment of the present invention, a width of each of the sensing signal transmission wires is substantially the same, while length of each of the sensing signal transmission wires is different.

According to an exemplary embodiment of the present invention, the readout resolution of the sensing signal readout circuit ranges from −1 pF to 1 pF.

According to an exemplary embodiment of the present invention, an overlapping area between each of the sensing signal transmission wires and the capacitance compensation conductor is substantially different.

According to an exemplary embodiment of the present invention, the touch panel further includes a dielectric layer disposed on the substrate to cover the sensing signal transmission wires, and the capacitance compensation conductor is disposed on the dielectric layer.

In the present application, a touch panel including a substrate, a touch-sensing circuit, a plurality of sensing signal transmission wires, a plurality of electrostatic discharge conductors, an electrostatic charge releasing wire, and a sensing signal readout circuit is further provided. The touch-sensing circuit is disposed on the substrate and includes a plurality of sensing series. The sensing signal transmission wires are disposed on the substrate and electrically connected to the sensing series. The electrostatic discharge conductors are disposed on the substrate and electrically connected to the sensing series. The electrostatic charge releasing wire is disposed on the substrate. Capacitance of each of the sensing signal transmission wires is C1, and coupling capacitance between each of the electrostatic discharge conductors and the electrostatic charge releasing wire is C3. The sensing signal readout circuit is electrically connected to the sensing signal transmission wires. In each of the electrostatic discharge conductors and each of the sensing signal transmission wires connected to the same sensing series, variation of summation of the capacitances C1 and C3 is less than a readout resolution of the sensing signal readout circuit.

According to an exemplary embodiment of the present invention, the coupling capacitance C3 between each of the electrostatic discharge conductors and the electrostatic charge releasing wire is substantially different.

According to an exemplary embodiment of the present invention, the sensing series include a plurality of first sensing series and a plurality of second sensing series. The first sensing series extend along a first direction and are electrically insulated from one another. The second sensing series extend along a second direction and are electrically insulated from one another. Each of the first sensing series includes a plurality of first sensing pads and a plurality of first bridge portions, and each of the first bridge portions is electrically connected between two of the first sensing pads adjacent to each other. Each of the second sensing series includes a plurality of second sensing pads and a plurality of second bridge portions, and each of the second bridge portions is electrically connected between two of the second sensing pads adjacent to each other.

According to an exemplary embodiment of the present invention, a width of each of the sensing signal transmission wires is substantially the same, while a length of each of the sensing signal transmission wires is different.

According to an exemplary embodiment of the present invention, the readout resolution of the sensing signal readout circuit ranges from −1 pF to 1 pF.

According to an exemplary embodiment of the present invention, each of the electrostatic discharge conductors has a first protrusion, and the electrostatic charge releasing wire has a plurality of second protrusions. Each of the first protrusions is aligned to one of the second protrusions. Besides, an overlapping area between each of the first protrusions and the corresponding second protrusion is substantially different, for example. In addition, one or more of the overlapping areas between the aligned first protrusions and second protrusions is 0, for example.

Based on the above, different capacitances of the sensing signal transmission wires can be compensated by properly disposing the capacitance compensation conductor over the sensing signal transmission wires or by appropriately adjusting disposition of the electrostatic charge releasing wire and the electrostatic discharge conductors. Moreover, through modulating the capacitance C1 of each of the sensing signal transmission wires, the coupling capacitance C2 between the capacitance compensation conductor and each of the sensing signal transmission wires, or the coupling capacitance C3 between each of the electrostatic discharge conductors and the electrostatic charge releasing wire, the variation of summation of the capacitances C1 and C2 or the variation of summation of the capacitances C1 and C3 is less than the readout resolution of the sensing signal readout circuit. Thereby, erroneous detection of the touch-sensing signals can be prevented, and favorable touch-sensing and display quality can be achieved.

In order to make the aforementioned and other features and advantages of the present invention more comprehensible, several embodiments accompanying figures are described in detail below.

BRIEF DESCRIPTION OF THE DRAWINGS

The accompanying drawings are included to provide a further understanding of the invention and are incorporated in and constitute a part of this specification. The drawings illustrate embodiments of the invention and, together with the description, serve to explain the principles of the invention.

DESCRIPTION OF EMBODIMENTS

First Embodiment

Figure 2A:
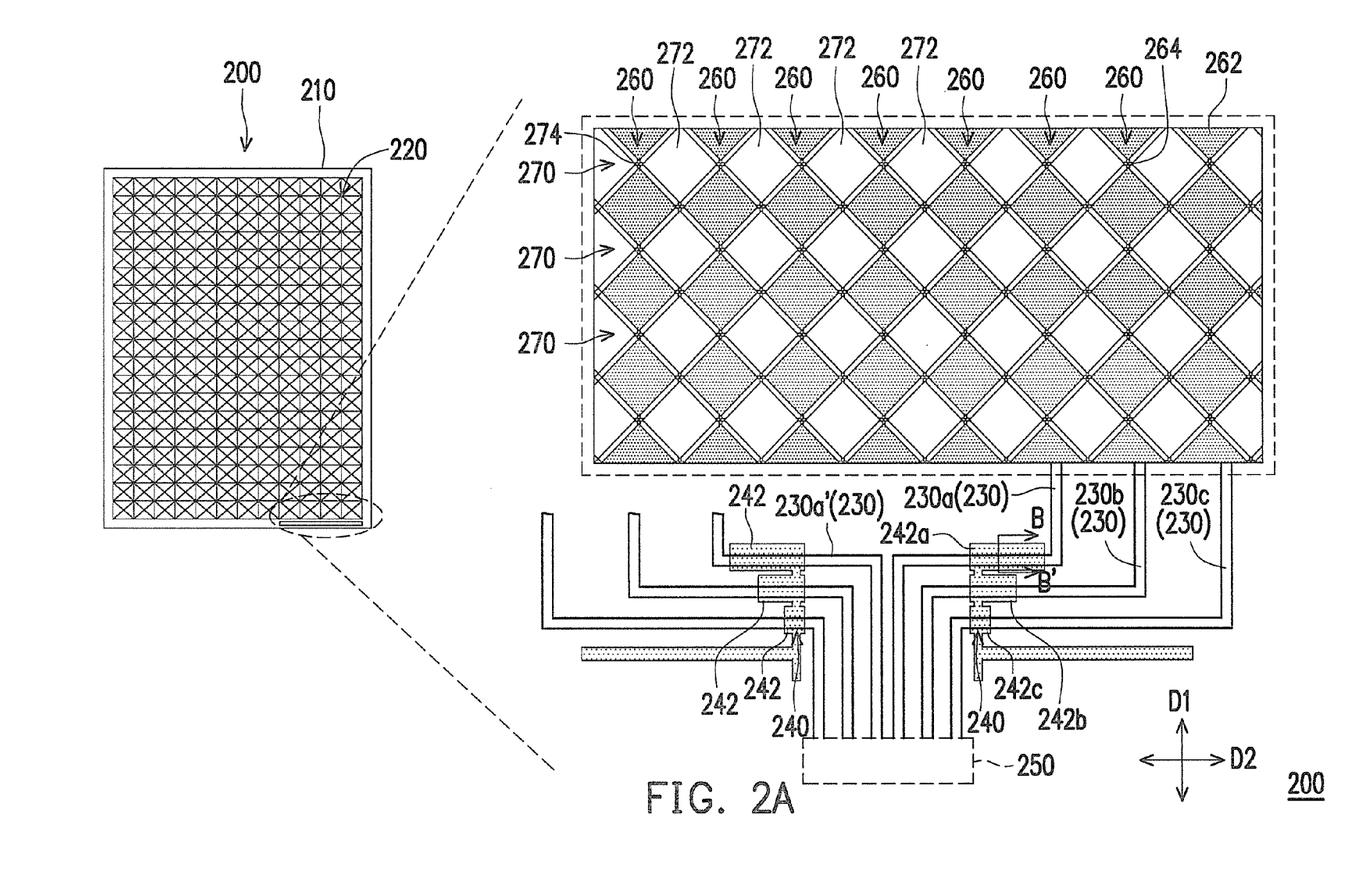
FIG. 2A is a schematic top view of a touch panel according to a first embodiment of the present invention.

FIG. 2A is a schematic top view of a touch panel according to a first embodiment of the present invention. In FIG. 2A, a touch panel 200 includes a substrate 210, a touch-sensing circuit 220, a plurality of sensing signal transmission wires 230, a capacitance compensation conductor 240, and a sensing signal readout circuit 250. The touch-sensing circuit 220 is disposed on the substrate 210 for sensing touch-sensing events initiated by a user who touches a touch-sensing region of the substrate 210. In addition, the sensing signal transmission wires 230 are disposed on the substrate 210 and electrically connected to the touch-sensing circuit 220. According to the present embodiment, width of each of the sensing signal transmission wires 230 is substantially the same, while length of each of the sensing signal transmission wires 230 is different. The capacitance compensation conductor 240 is disposed over the sensing signal transmission wires 230. Capacitance of each of the sensing signal transmission wires 230 is C1, and coupling capacitance between each of the sensing signal transmission wires 230 and the capacitance compensation conductor 240 is C2. The sensing signal readout circuit 250 is electrically connected to the sensing signal transmission wires 230 that are utilized for transmitting the touch-sensing events detected by the touch-sensing circuit 220 to the sensing signal readout circuit 250. Particularly, in each of the sensing signal transmission wires 230, variation of summation of the capacitances C1 and C2 is less than a readout resolution of the sensing signal readout circuit 250.

As indicated in FIG. 2A, the touch-sensing circuit 220 includes a plurality of first sensing series 260 and a plurality of second sensing series 270 for detecting the touch-sensing events initiated by the user who touches the touch-sensing region. Here, the first sensing series 260 are disposed on the substrate 210, and each of the first sensing series 260 extends along a first direction D1 and is electrically insulated from one another. The second sensing series 270 are disposed on the substrate 210, and each of the second sensing series 270 extends along a second direction D2 and is electrically insulated from one another. In detail, each of the first sensing series 260 includes a plurality of first sensing pads 262 and a plurality of first bridge portions 264, and each of the first bridge portions 264 is electrically connected between two of the first sensing pads 262 adjacent to each other. Each of the second sensing series 270 includes a plurality of second sensing pads 272 and a plurality of second bridge portions 274, and each of the second bridge portions 274 is electrically connected between two of the second sensing pads 272 adjacent to each other. The first sensing pads 262 and the second sensing pads 272 can constitute a sensing array to achieve surface sensing.

With reference to FIG. 2A, in the present embodiment, the capacitance C1 of each of the sensing signal transmission wires 230 is substantially different, which means the capacitances C1 of the sensing signal transmission wires 230 are mostly different but occasionally the same. Specifically, as indicated in FIG. 2A, the length of the sensing signal transmission wire 230a is La, the length of the sensing signal transmission wire 230b is Lb, and the length of the sensing signal transmission wire 230c is Lc, wherein La<Lb<Lc. Thus, capacitances C1a, C1b, and C1c of the sensing signal transmission wires 230a, 230b, and 230c satisfy the following formula: C1a<C1b<C1c. That is to say, the capacitances C1a, C1b, and C1c of the sensing signal transmission wires 230a, 230b, and 230c as shown at the right-hand side in FIG. 2A are different from one another.

In consideration of utilization of the substrate 210, note that a set of sensing signal transmission wires 230 corresponding to the same sensing chip can be symmetrically arranged. Therefore, under the aforesaid symmetrical layout, the symmetrically arranged sensing signal transmission wires 230, e.g. the sensing signal transmission wires 230a and 230a' indicated in FIG. 2A, have the same length and accordingly the same capacitance. Besides, based on layout consideration of the touch panel 200, the sensing signal transmission wires 230 respectively corresponding to different sensing chips but located at the same relative positions can also have the same length and the same capacitance.

Figure 2B:
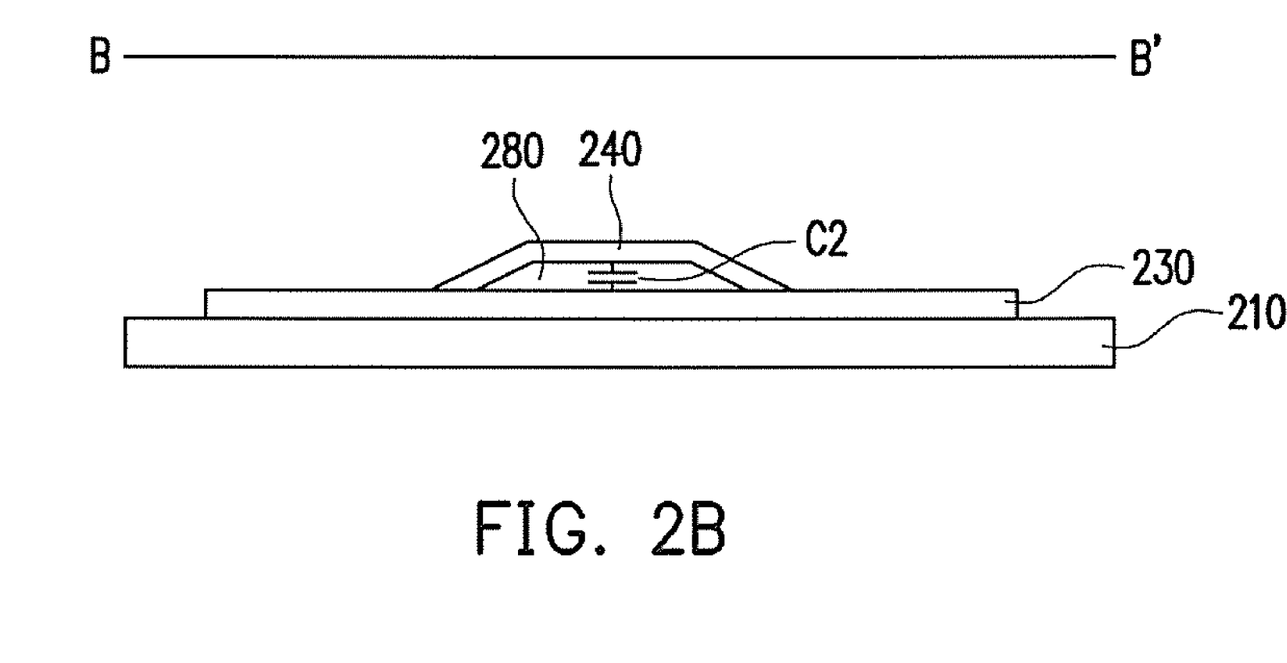
FIG. 2B is a schematic cross-sectional view taken along a section line B-B' depicted in FIG. 2A.

FIG. 2B is a schematic cross-sectional view taken along a section line B-B' depicted in FIG. 2A. In FIGS. 2A and 2B, to compensate different capacitances of the sensing signal transmission wires 230, the capacitance compensation conductor 240 is disposed over each of the sensing signal transmission wires 230. Specifically, in the present embodiment, the touch panel 200 further includes a dielectric layer 280 disposed on the substrate 210 to cover the sensing signal transmission wires 230. The capacitance compensation conductor 240 is disposed on the dielectric layer 280. An overlapping area between each of the sensing signal transmission wires 230 and the capacitance compensation conductor 240 along a length direction of the sensing signal transmission wire 230 is substantially different, for example, such that the coupling capacitance between each of the sensing signal transmission wires 230 and the corresponding conductor pattern 242 is substantially different.

More particularly, each of the conductor patterns 242 in the capacitance compensation conductor 240 has different length and each of the conductor patterns 242 extends along a length direction of each of the sensing signal transmission wires 230, so as to generate the coupling capacitance C2 between each of the sensing signal transmission wires 230 and the corresponding conductor pattern 242. The coupling capacitance C2 between each of the sensing signal transmission wires 230 and the corresponding conductor pattern 242 is substantially different, such that varied capacitances of the sensing signal transmission wires 230 can be compensated.

Figure 2C:
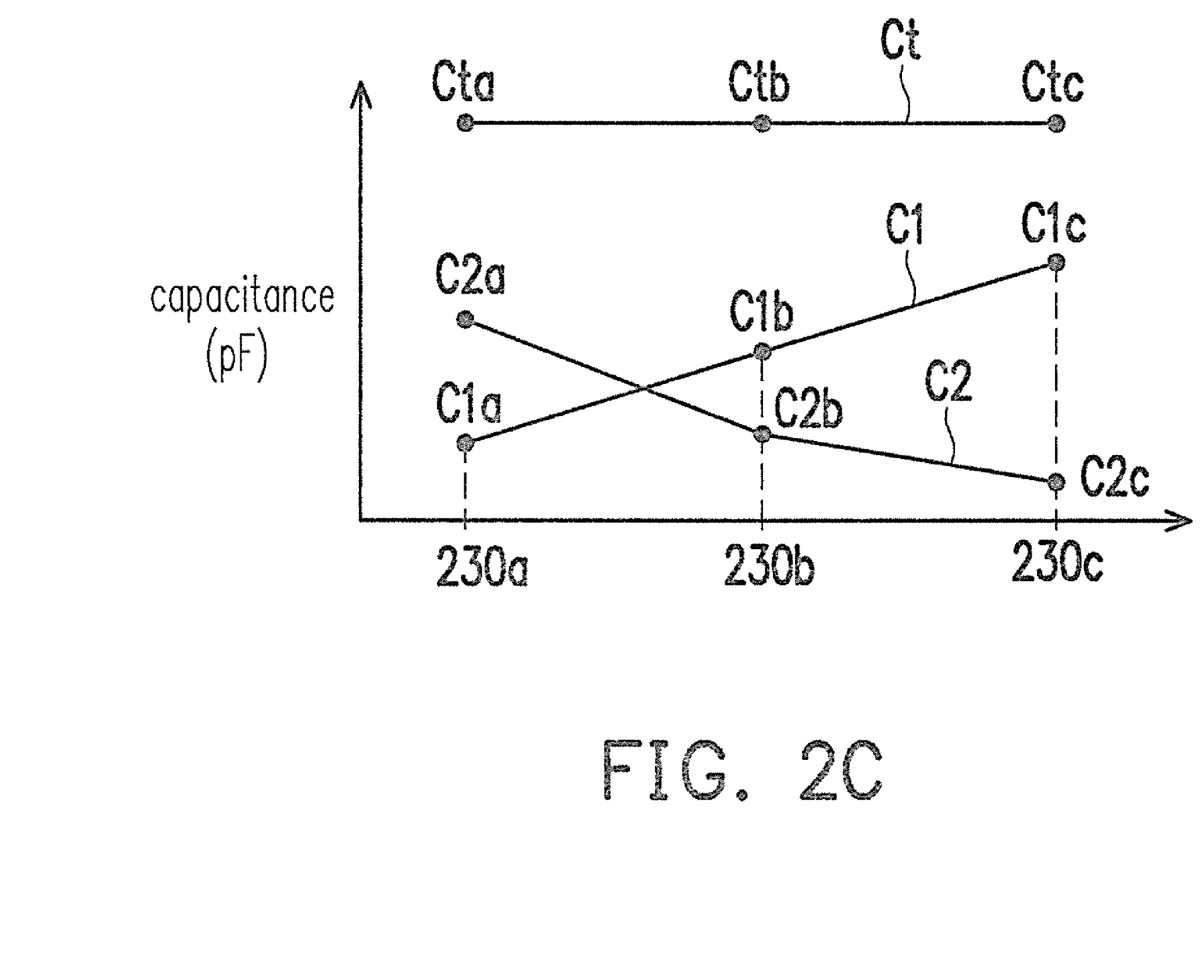
FIG. 2C is a schematic view illustrating capacitance compensation of sensing signal transmission wires according to the first embodiment of the present invention.

FIG. 2C is a schematic view illustrating capacitance compensation of sensing signal transmission wires according to the first embodiment of the present invention. As indicated in FIGS. 2A and 2C, the capacitances C1a, C1b, and C1c of the sensing signal transmission wires 230a, 230b, and 230c satisfy the formula C1a<C1b<C1c. Hence, a conductor pattern 242a is disposed over the sensing signal transmission wire 230a, and a conductor pattern 242c is disposed over the sensing signal transmission wire 230c. Here, an overlapping area between the conductor pattern 242a and the sensing signal transmission wire 230a is greater than an overlapping area between the conductor pattern 242c and the sensing signal transmission wire 230c. Thereby, coupling capacitances C2a, C2b, and C2c between the capacitance compensation conductor 240 and each of the sensing signal transmission wires 230a, 230b, and 230c satisfy the formula C2a>C2b>C2c. Accordingly, in each of the sensing signal transmission wires 230a, 230b, and 230c, total capacitances Cta, Ctb, and Ctc that are detected during transmission of the touch-sensing signals are rather consistent, such that different capacitances caused by different length of the sensing signal transmission wires 230 can be effectively compensated even though that the layout space of the substrate 210 is limited.

Likewise, the coupling capacitance C2 generated between each of the sensing signal transmission wires 230 and the corresponding conductor pattern 242 is substantially different but occasionally identical. That is to say, the capacitances C1 and C2 are not fixed constants, and the capacitances C1 and C2 in each of the sensing signal transmission wires 230 with different length are substantially different.

When a user actually touches the touch panel 200 with a finger, the first sensing series 260 and the second sensing series 270 on the touch panel 200 cause a variation in capacitance on a position where the finger touches. The varied capacitance is transformed into a touch-sensing signal, transmitted to the sensing signal readout circuit 250 through the sensing signal transmission wires 230, and then processed. After that, an appropriate command based on the processed signal is output for operating the corresponding electronic apparatus receiving the aforesaid command.

Note that the touch panel 200 of the present embodiment is able to compensate different capacitances of the sensing signal transmission wires 230 by disposing the capacitance compensation conductor 240, such that the touch-sensing signal transmitted through respective sensing signal transmission wires 230 is not affected by the different capacitances. Moreover, erroneous detection of the touch-sensing signal does not occur in the touch panel 200 of the present embodiment because the variation of summation of the capacitances C1 and C2 is adjusted to be less than the readout resolution of the sensing signal readout circuit 250. It should be mentioned that the readout resolution of the sensing signal readout circuit 250 discussed herein refers to the capacitance variation in unit of pF, and the capacitance variation can be recognized by the sensing signal readout circuit 250. For instance, the readout resolution of the sensing signal readout circuit 250 ranges from −1 pF to 1 pF.

Second Embodiment

Figure 3A:
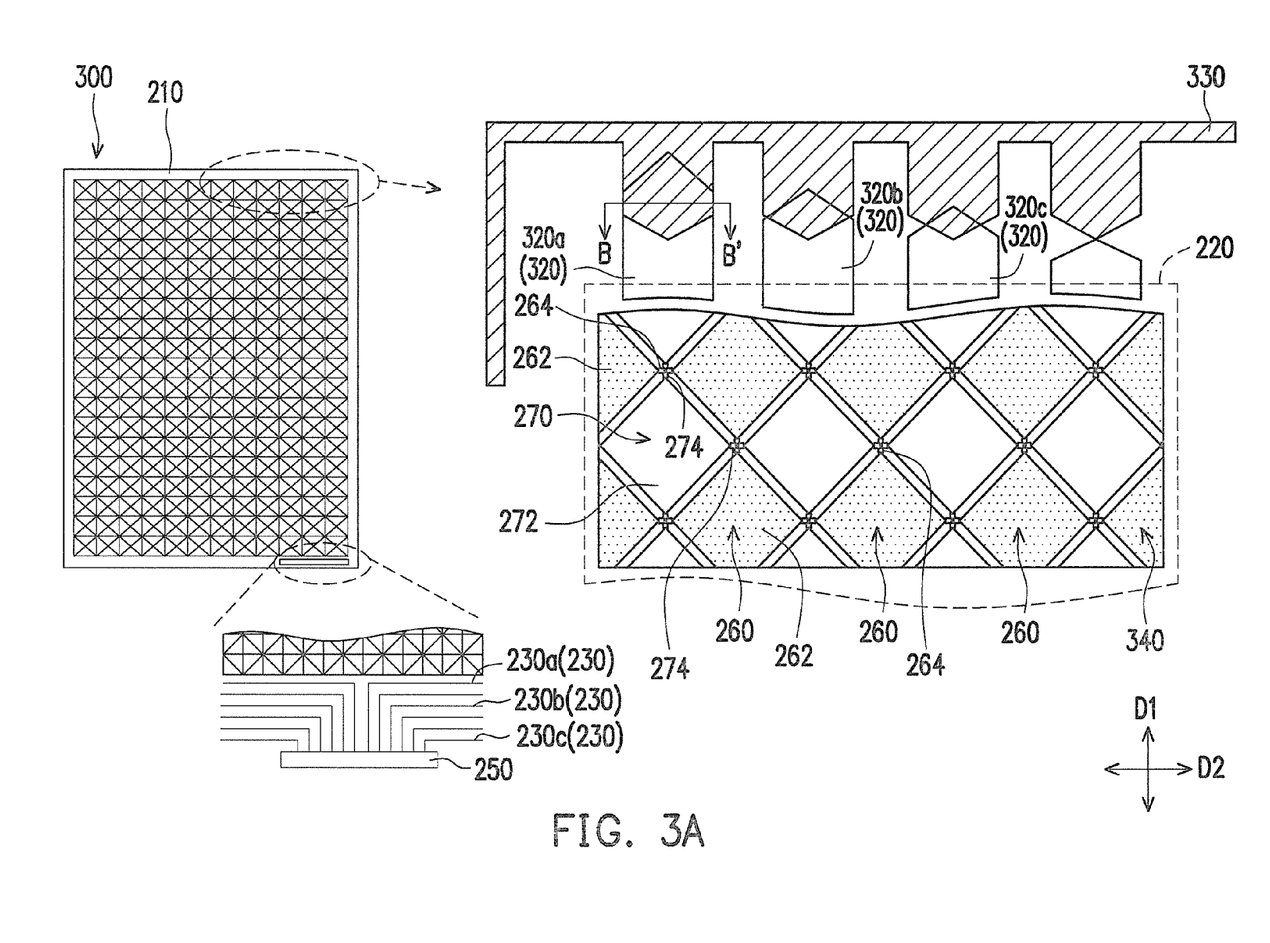
FIG. 3A is a schematic top view of a touch panel according to a second embodiment of the present invention.

FIG. 3A is a schematic top view of a touch panel according to a second embodiment of the present invention. In FIG. 3A, a touch panel 300 includes a substrate 210, a touch-sensing circuit 220, a plurality of sensing signal transmission wires 230, a plurality of electrostatic discharge conductors 320, an electrostatic charge releasing wire 330, and a sensing signal readout circuit 250. The touch-sensing circuit 220 is disposed on the substrate 210 and includes a plurality of sensing series 340 disposed in a touch-sensing region of the substrate 210. The sensing signal transmission wires 230 are disposed on the substrate 210 and electrically connected to the sensing series 340. The electrostatic discharge conductors 320 are disposed on the substrate 210 and electrically connected to the sensing series 340. The electrostatic charge releasing wire 330 is disposed on the substrate 210. Capacitance of each of the sensing signal transmission wires 230 is C1, and coupling capacitance between each of the electrostatic discharge conductors 320 and the electrostatic charge releasing wire 330 is C3. The sensing signal readout circuit 250 is electrically connected to the sensing signal transmission wires 230. In each of the electrostatic discharge conductors 320 and each of the sensing signal transmission wires 230 connected to the same sensing series 340, variation of summation of the capacitances C1 and C3 is less than a readout resolution of the sensing signal readout circuit 250.

In particular, as indicated in FIG. 3A, the sensing series 340 include a plurality of first sensing series 260 and a plurality of second sensing series 270. The first sensing series 260 extend along a first direction D1 and are electrically insulated from one another. The second sensing series 270 extend along a second direction D2 and are electrically insulated from one another. Each of the first sensing series 260 includes a plurality of first sensing pads 262 and a plurality of first bridge portions 264, and each of the first bridge portions 264 is electrically connected between two of the first sensing pads 262 adjacent to each other. Each of the second sensing series 270 includes a plurality of second sensing pads 272 and a plurality of second bridge portions 274, and each of the second bridge portions 274 is electrically connected between two of the second sensing pads 272 adjacent to each other. The first sensing pads 262 and the second sensing pads 272 can constitute a sensing array to achieve surface sensing.

In the present embodiment, the capacitance of each of the sensing signal transmission wires 230 is substantially different, which is already defined in the first embodiment and is thus not further described hereinafter. More specifically, the capacitances $C1a$, $C1b$, and $C1c$ of the sensing signal transmission wires $230a$, $230b$, and $230c$ satisfy the following formula: $C1a<C1b<C1c$. In the present embodiment, to compensate different capacitances of the sensing signal transmission wires 230, an electrostatic charge releasing wire 330 is disposed right below the electrostatic discharge conductors 320 electrically connected to the sensing signal transmission wires 230. Here, an overlapping area between the electrostatic charge releasing wire 330 and each of the electrostatic discharge conductors 320 is different.

Figure 3B:
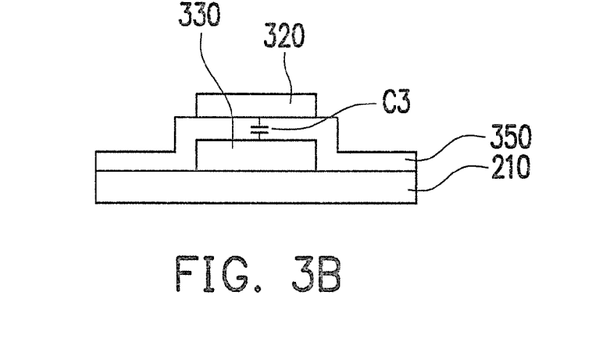
FIG. 3B is a schematic cross-sectional view taken along a section line B-B' depicted in FIG. 3A.

FIG. 3B is a schematic cross-sectional view taken along a section line B-B' depicted in FIG. 3A. As shown in FIGS. 3A and 3B, the touch panel 300 further includes a dielectric layer 350. In the present embodiment, the dielectric layer 350 is disposed between the electrostatic discharge conductors 320 and the electrostatic charge releasing wire 330 and covers the electrostatic charge releasing wire 330. The electrostatic discharge conductors 320 are disposed on the dielectric layer 350 which is located above a portion of the electrostatic charge releasing wire 330, such that a coupling capacitance C3 is generated between the electrostatic charge releasing wire 330 and each corresponding electrostatic discharge conductor 320. Since the overlapping area between the electrostatic charge releasing wire 330 and each of the electrostatic discharge conductors 320 electrically connected to one of the sensing signal transmission wires 230 is substantially different, the coupling capacitance C3 generated between the electrostatic charge releasing wire 330 and each corresponding electrostatic discharge conductor 320 is substantially different.

Figure 3C:
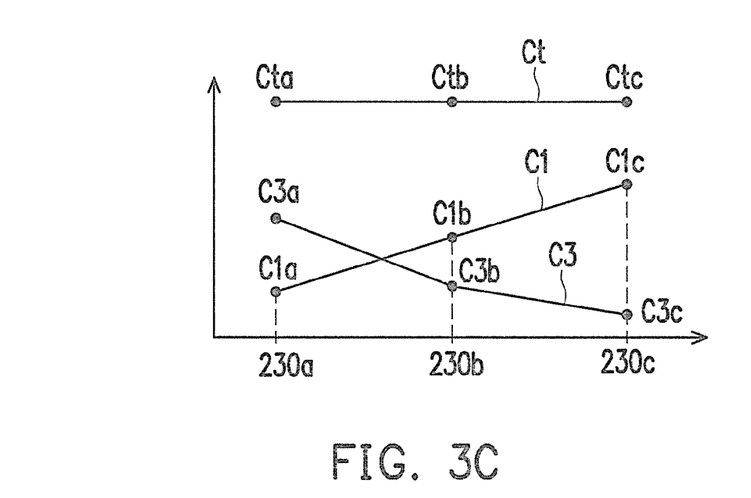
FIG. 3C is a schematic view illustrating capacitance compensation of sensing signal transmission wires according to the second embodiment of the present invention.

FIG. 3C is a schematic view illustrating capacitance compensation of sensing signal transmission wires according to the second embodiment of the present invention. In FIGS. 3A and 3C, the capacitances $C1a$, $C1b$, and $C1c$ of the sensing signal transmission wires $230a$, $230b$, and $230c$ satisfy the formula $C1a<C1b<C1c$, and the electrostatic discharge conductors electrically connected to the sensing signal transmission wires $230a$, $230b$, and $230c$ are $320a$, $320b$, and $320c$, respectively. In the present embodiment, an overlapping area between the electrostatic discharge conductor $320a$ and the electrostatic charge releasing wire 330 is greater than an overlapping area between the electrostatic discharge conductor $320c$ and the electrostatic charge releasing wire 330, such that the coupling capacitances $C3a$, $C3b$, and $C3c$ between each of the electrostatic discharge conductors $320a$, $320b$ and $320c$ and the corresponding electrostatic charge releasing wire 330 satisfy the formula $C3a>C3b>C3c$. Accordingly, in each of the sensing signal transmission wires $230a$, $230b$, and $230c$, total capacitances Cta, Ctb, and Ctc that are detected during transmission of the touch-sensing signal are rather consistent, such that different capacitances caused by different length of the sensing signal transmission wires 230 can be effectively compensated despite the limited layout space of the substrate 210.

Note that the touch panel 300 of the present embodiment is able to compensate different capacitances of the sensing signal transmission wires 230 by disposing the electrostatic discharge conductors 320, such that the touch-sensing signal transmitted through respective sensing signal transmission wires 230 is not affected by the different capacitances. Moreover, erroneous detection of the touch-sensing signal does not occur in the touch panel 300 of the present embodiment because the variation of summation of the capacitances C1 and C3 is adjusted to be less than the readout resolution of the sensing signal readout circuit 250. Similarly, the readout resolution of the sensing signal readout circuit 250 discussed herein refers to the capacitance variation in unit of pF, and the capacitance variation can be recognized by the sensing signal readout circuit 250. For instance, the readout resolution of the sensing signal readout circuit 250 ranges from −1 pF to 1 pF.

Third Embodiment

Figure 4A:
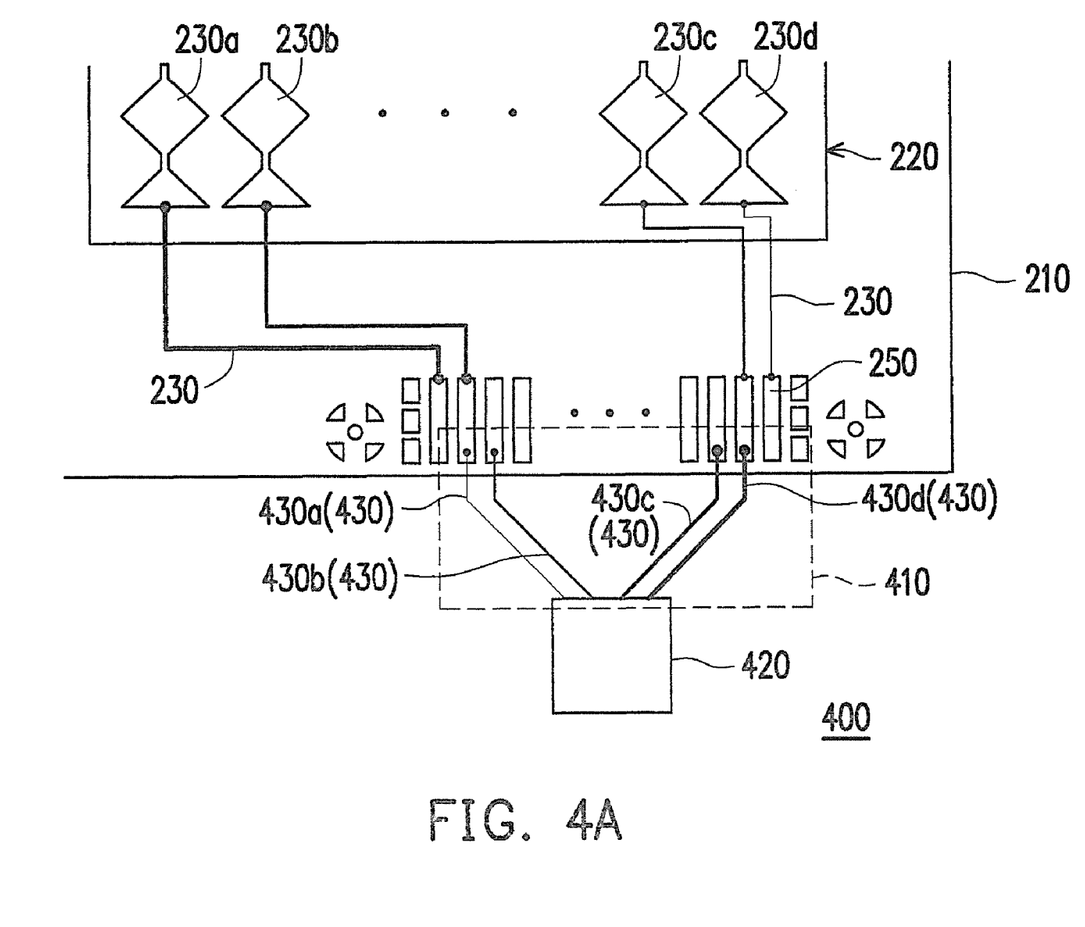
FIG. 4A is a schematic top view of a touch panel according to a third embodiment of the present invention.

FIG. 4A is a schematic top view of a touch panel according to a third embodiment of the present invention. Referring to FIG. 4A, the touch panel 400 of the present embodiment is similar to the touch panel 200 of the first embodiment, while the touch panel 400 further includes a flexible printed circuit board 410 for connecting the sensing signal transmission wires 230 and a sensing chip 420. According to the present embodiment, the capacitances of the sensing signal transmission wires 230 can also be manipulated by adjusting the width of the sensing signal transmission wires 230. Besides, in the present embodiment, capacitance compensation wires 430 used for compensating different capacitances of the sensing signal transmission wires 230 are disposed on the flexible printed circuit board 410. As shown in FIG. 4A, the touch panel 400 of the present embodiment includes the substrate 210, the touch-sensing circuit 220, the sensing signal transmission wires 230, the sensing signal readout circuit 250, and the flexible printed circuit board 410. Note that the capacitance compensation wires 430 respectively corresponding to the sensing signal transmission wires 230 are disposed on the flexible printed circuit board 410. Since the capacitance compensation wires 430 have substantially identical length but different width, the different capacitances of the sensing signal transmission wires 230 can be compensated.

Figure 4B:
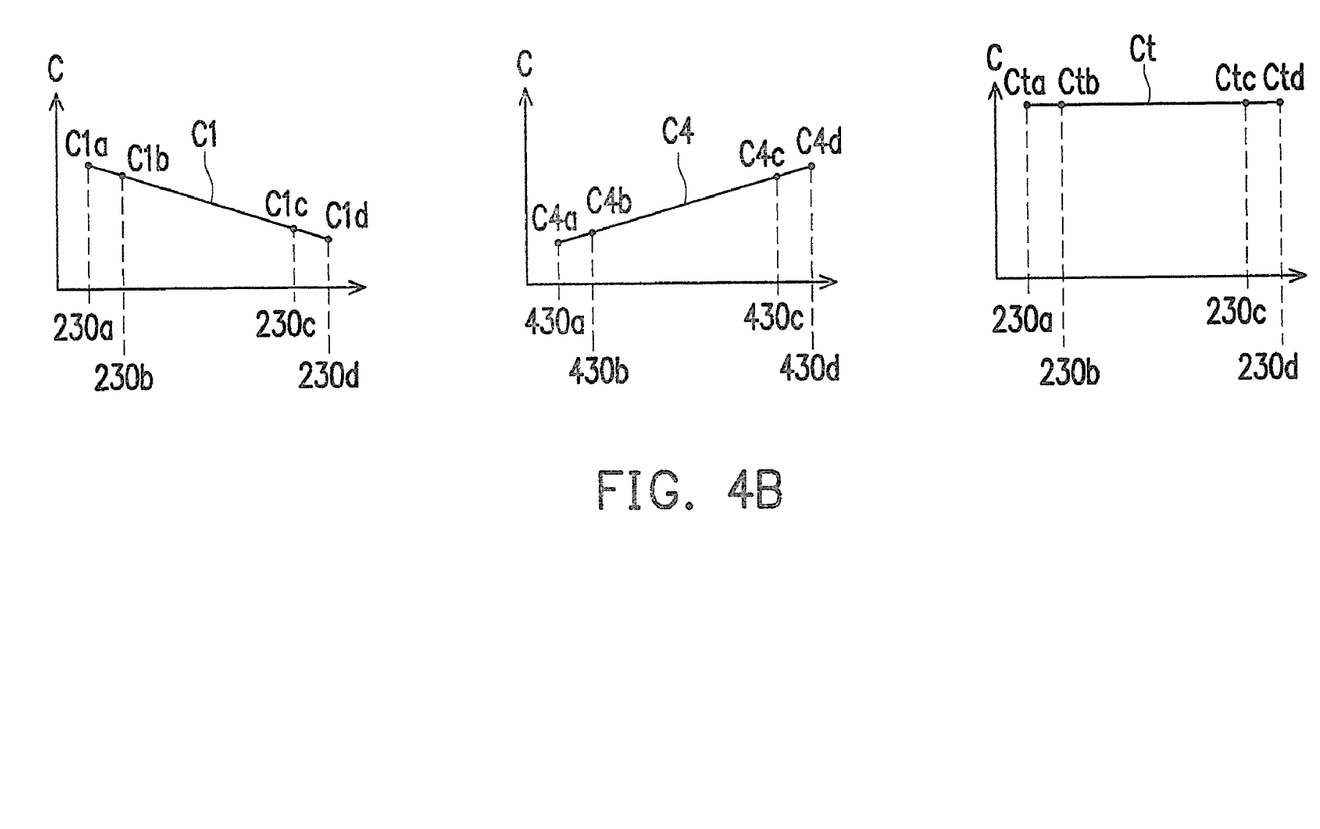
FIG. 4B is a schematic view illustrating capacitance compensation of sensing signal transmission wires in the touch panel depicted in FIG. 4A.

FIG. 4B is a schematic view illustrating capacitance compensation of sensing signal transmission wires in the touch panel depicted in FIG. 4A. Referring to FIGS. 4A and 4B, capacitances $C1a$, $C1b$, $C1c$, and $C1d$ of sensing signal transmission wires $230a$, $230b$, $230c$, and $230d$ satisfy the formula $C1a > C1b > C1c > C1d$, and therefore the width of the capacitance compensation wires 430 respectively connected to the sensing signal transmission wires $230a$, $230b$, $230c$, and $230d$ can be sequentially increased. As such, coupling capacitances $C4a$, $C4b$, $C4c$, and $C4d$ between each of the sensing signal transmission wires $230a$, $230b$, $230c$, and $230d$ and the corresponding capacitance compensation wires 430 on the flexible printed circuit board 410 satisfy the formula $C4a < C4b < C4c < C4d$. Accordingly, in each of the sensing signal transmission wires $230a$, $230b$, $230c$, and $230d$, total capacitances Cta, Ctb, Ctc, and Ctd that are detected during transmission of the touch-sensing signal are rather consistent, such that different capacitances caused by different length of the sensing signal transmission wires 230 can be effectively compensated despite the limited layout space of the substrate 210.

Certainly, erroneous detection of the touch-sensing signal does not occur in the touch panel 400 of the present embodiment because the variation summation of the capacitances C1 and C4 is adjusted to be less than the readout resolution of the sensing signal readout circuit 250.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A touch panel, comprising:
    a substrate;
    a touch-sensing circuit disposed on the substrate;
    a plurality of sensing signal transmission wires disposed on the substrate and electrically connected to the touch-sensing circuit;
    a capacitance compensation conductor disposed over the sensing signal transmission wires, wherein capacitance of each of the sensing signal transmission wires is C1, and coupling capacitance between each of the sensing signal transmission wires and the capacitance compensation conductor is C2; and
    a sensing signal readout circuit electrically connected to the sensing signal transmission wires, wherein in each of the sensing signal transmission wires, variation of summation of the capacitances C1 and C2 is less than a readout resolution of the sensing signal readout circuit.

2. The touch panel as claimed in claim 1, wherein the capacitance C1 of each of the sensing signal transmission wires is substantially different, and the coupling capacitance C2 between each of the sensing signal transmission wires and the capacitance compensation conductor is substantially different.

3. The touch panel as claimed in claim 1, the touch-sensing circuit comprising:
    a plurality of first sensing series disposed on the substrate, wherein each of the first sensing series extends along a first direction and is electrically insulated from one another; and
    a plurality of second sensing series disposed on the substrate, wherein each of the second sensing series extends along a second direction and is electrically insulated from one another.

4. The touch panel as claimed in claim 3, wherein each of the first sensing series comprises a plurality of first sensing pads and a plurality of first bridge portions, each of the first bridge portions is electrically connected to the adjacent first sensing pads, each of the second sensing series comprises a plurality of second sensing pads and a plurality of second bridge portions, and each of the second bridge portions is electrically connected to the adjacent second sensing pads.

5. The touch panel as claimed in claim 1, wherein width of each of the sensing signal transmission wires is substantially the same, while length of each of the sensing signal transmission wires is different.

6. The touch panel as claimed in claim 1, wherein the readout resolution of the sensing signal readout circuit ranges from −1 pF to 1 pF.

7. The touch panel as claimed in claim 1, wherein an overlapping area between each of the sensing signal transmission wires and the capacitance compensation conductor is substantially different.

8. The touch panel as claimed in claim 1, further comprising a dielectric layer disposed on the substrate to cover the sensing signal transmission wires, wherein the capacitance compensation conductor is disposed on the dielectric layer.

9. A touch panel, comprising:
    a substrate;
    a touch-sensing circuit disposed on the substrate, wherein the touch-sensing circuit comprises a plurality of sensing series;
    a plurality of sensing signal transmission wires disposed on the substrate and electrically connected to the sensing series;
    a plurality of electrostatic discharge conductors disposed on the substrate and electrically connected to the sensing series;
    an electrostatic charge releasing wire disposed on the substrate, wherein capacitance of each of the sensing signal transmission wires is C1, and coupling capacitance between each of the electrostatic discharge conductors and the electrostatic charge releasing wire is C3; and
    a sensing signal readout circuit electrically connected to the sensing signal transmission wires, wherein in each of the electrostatic discharge conductors and each of the sensing signal transmission wires connected to one of the sensing series, variation of summation of the capacitances C1 and C3 is less than a readout resolution of the sensing signal readout circuit.

10. The touch panel as claimed in claim 9, wherein the coupling capacitance C3 between each of the electrostatic discharge conductors and the electrostatic charge releasing wire is substantially different.

11. The touch panel as claimed in claim 9, the sensing series comprising:
- a plurality of first sensing series extending along a first direction and electrically insulated from one another; and
- a plurality of second sensing series extending along a second direction and electrically insulated from one another.

12. The touch panel as claimed in claim 11, wherein each of the first sensing series comprises a plurality of first sensing pads and a plurality of first bridge portions, each of the first bridge portions is electrically connected between two of the first sensing pads adjacent to each other, each of the second sensing series comprises a plurality of second sensing pads and a plurality of second bridge portions, and each of the second bridge portions is electrically connected between two of the second sensing pads adjacent to each other.

13. The touch panel as claimed in claim 9, wherein width of each of the sensing signal transmission wires is substantially the same, while length of each of the sensing signal transmission wires is different.

14. The touch panel as claimed in claim 9, wherein the readout resolution of the sensing signal readout circuit ranges from −1 pF to 1 pF.

15. The touch panel as claimed in claim 9, wherein each of the electrostatic discharge conductors has a first protrusion, the electrostatic charge releasing wire has a plurality of second protrusions, and each of the first protrusions is aligned to one of the second protrusions.

16. The touch panel as claimed in claim 15, wherein an overlapping area between each of the first protrusions and the corresponding second protrusion is substantially different.

17. The touch panel as claimed in claim 16, wherein one or more of the overlapping areas between the aligned first protrusions and second protrusions is 0.

* * * * *